(12) United States Patent
Fotland

(10) Patent No.: US 9,632,655 B2
(45) Date of Patent: Apr. 25, 2017

(54) NO-TOUCH CURSOR FOR ITEM SELECTION

(71) Applicant: David Allen Fotland, San Jose, CA (US)

(72) Inventor: David Allen Fotland, San Jose, CA (US)

(73) Assignee: AMAZON TECHNOLOGIES, INC., Seattle, WA (US)

(*) Notice: Subject to any disclaimer, the term of this patent is extended or adjusted under 35 U.S.C. 154(b) by 465 days.

(21) Appl. No.: 14/105,853

(22) Filed: Dec. 13, 2013

(65) Prior Publication Data

US 2015/0169171 A1     Jun. 18, 2015

(51) Int. Cl.
*G06F 3/0481*   (2013.01)
*G06F 1/16*     (2006.01)
*G06F 3/03*     (2006.01)

(52) U.S. Cl.
CPC ........ *G06F 3/04812* (2013.01); *G06F 1/1694* (2013.01); *G06F 3/0304* (2013.01); *G06F 2200/1637* (2013.01)

(58) Field of Classification Search
CPC ............. G06F 3/04812; G06F 3/04842; G06F 3/04817; G06F 3/0484
See application file for complete search history.

(56) References Cited

U.S. PATENT DOCUMENTS

| | | | |
|---|---|---|---|
| 2006/0094480 A1* | 5/2006 | Tanaka .................. | G06F 1/1613 455/575.1 |
| 2010/0125816 A1* | 5/2010 | Bezos ................... | G06F 1/1626 715/863 |
| 2010/0169773 A1* | 7/2010 | Yoo ........................ | G06F 3/016 715/702 |
| 2013/0135203 A1* | 5/2013 | Croughwell, III .... | G06F 1/1626 345/158 |

* cited by examiner

*Primary Examiner* — Premal Patel
(74) *Attorney, Agent, or Firm* — Seyfarth Shaw LLP; Ilan N. Barzilay; Tyrus S. Cartwright

(57) ABSTRACT

A tilt-based interface controls the position of a cursor on a graphical user interface (GUI) for mobile devices based on changes in the orientation of the device. Cursor positioning and user interface element selection may be accomplished without touching the screen or clicking a button to indicate the user's selection. The underlying coordinate system to which cursor movement is mapped is transformed to alter the speed and behavior of the cursor when the cursor reaches a user-selectable interface elements.

18 Claims, 11 Drawing Sheets

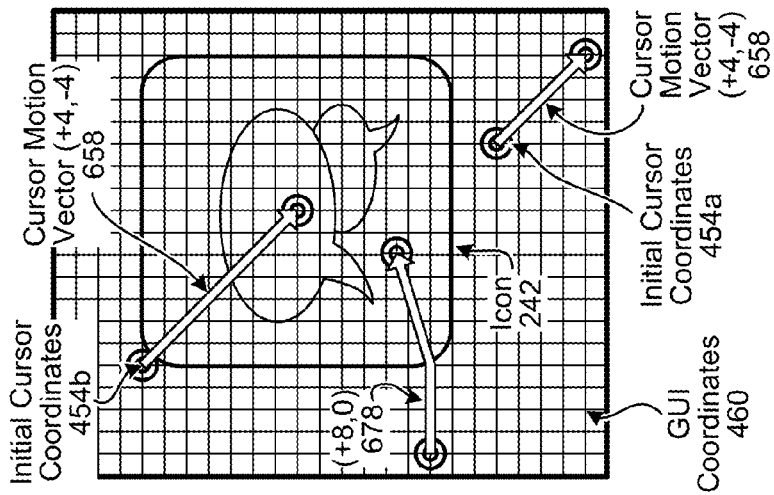
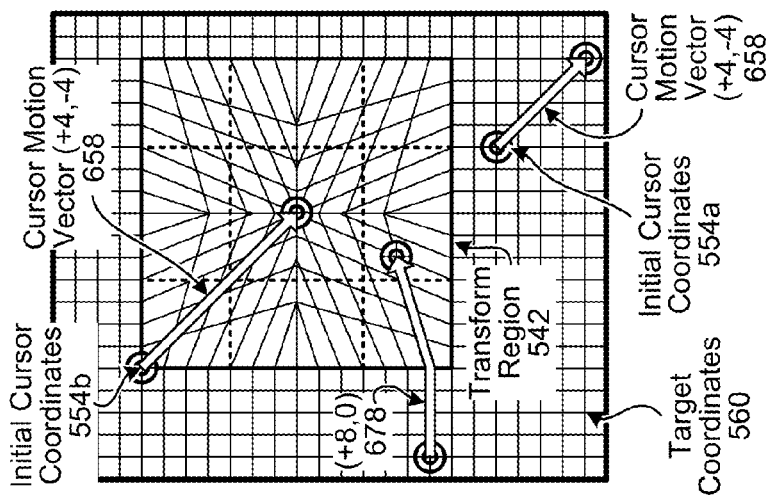
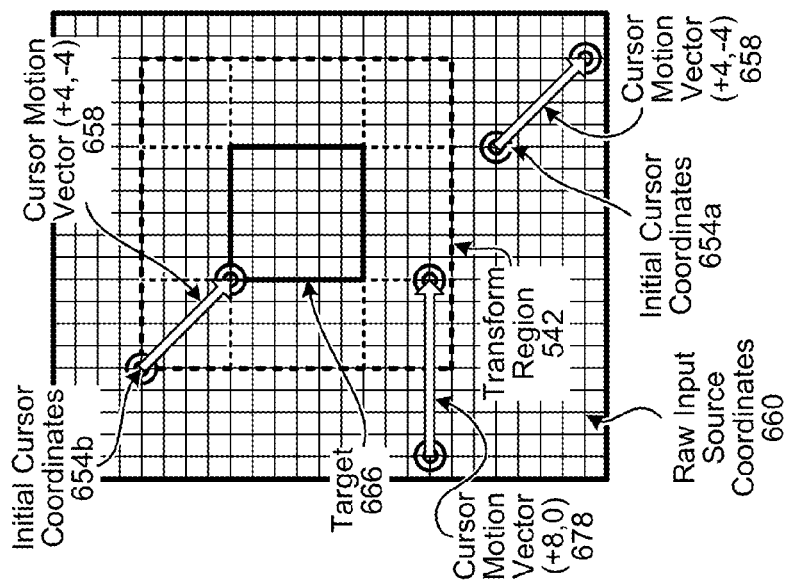

NO-TOUCH CURSOR FOR ITEM SELECTION

BACKGROUND

With the advancement of technology, the use of electronic devices with touch-enabled user interfaces and inertial-based motion sensors are becoming more prevalent. In general, the touch screen of an electronic device includes a user interface that provides elements defining touchable target areas for interaction with a user. The inertial-based motion sensors may be used, for among other things, to determine the orientation of the device, such that the user interface can be reoriented relative to actual device orientation. When the user touches a target area, various actions and re-actions of the user interface are triggered to control the electronic device.

BRIEF DESCRIPTION OF DRAWINGS

For a more complete understanding of the present disclosure, reference is now made to the following description taken in conjunction with the accompanying drawings.

FIGS. 6A to 6C demonstrate an example of how the transformed coordinates hold the cursor at a center a user interface element.

DETAILED DESCRIPTION

Figure 1:
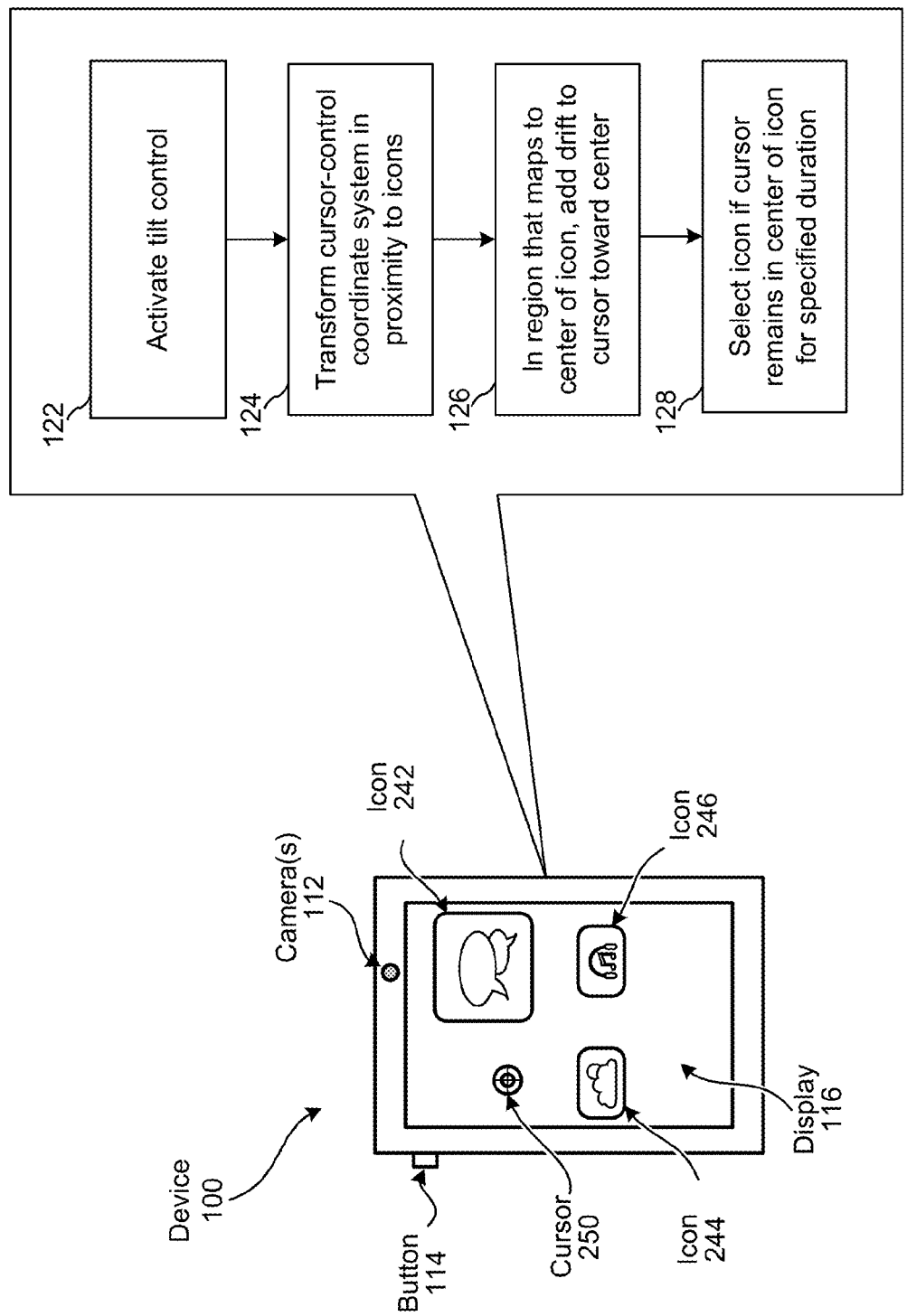
FIG. 1 illustrates a system for a tilt-based user interface for an electronic device.

A graphical user interface (GUI) for mobile devices provides control of an on-screen cursor based on changes of orientation made to the device. Cursor positioning and user interface element selection may be accomplished without requiring the user to touch the screen or clicking a "select" button. While the on-screen appearance of the GUI may be similar for touch and tilt interfaces, the underlying mechanics are reworked to make tilt control practical.

Mobile devices commonly use a touch screen to display a GUI which includes icons or other graphical elements with which a user may interact. Many icons are touchable by a user to operate the device such as engaging with an application, playing a game, launching a new application, altering a display, selecting linked text, etc. These user-selectable elements of a user interface (UI) may be referred to as "UI elements." A UI element may be a graphical element, textual element, or some combination thereof. Each UI element may be associated with a UI element boundary, which in the case of a touch-based system, is a defined area on the touch screen that, when touched by a user, activates a particular action associated with the respective UI element.

A UI element boundary corresponds generally (but may not correspond exactly due to shape and other constraints) to the area of the GUI associated with a UI element. For example, if an icon is a square with rounded corners, the UI element boundary may be a square with right-angle corners. Similarly, if the UI element is a hypertext link, the UI element boundary of the text may be a rectangle enveloping the edges of the text. If a user touches the screen within the UI element boundary, an action associated with the UI element is then triggered by the underlying computing processes of the device.

In some instances, a person may touch the screen and may miss activating the UI element because the touch does not occur within the intended boundary. With the small displays on mobile devices, it can be difficult to select small UI elements, such as a hypertext link embedded in a web page, because of the size of the UI element boundary, because the target area may be obscured under a user's finger, because the boundary may be in close proximity to the boundary of other UI elements, or the like. Also, small UI element boundaries in proximity to an edge of the display may be especially difficult to select if there is a raised bezel adjacent to the display edge, or if the mobile device is enveloped in a protective case that encroaches upon the edge of the touch display (e.g., creating a raised ridge along the edge).

Several approaches have been tried to mitigate these problems with various degrees of improvement. For example, if a user engages in a sustained press on a UI element, the GUI may display an image (which may be enlarged) of the UI element in an offset sub-window so that the user can see what is selected under their finger. As another example, when a user double-taps an area, the area is locally zoomed (temporarily) so that the user can see the UI elements in the area, making it easier to touch within the UI element's touch-reactive boundary. Another example is creating a magnified side window that shows the area beneath a user's finger, but offset from the contact area with the finger.

Each of these approaches is built on the existing touch-interface paradigm, requiring a large enough display to present the offset view in a position that can be seen around the user's finger, and only somewhat mitigating the physical impediment of a bezel or ridge along the edge of the display interfering with touch contact.

In comparison, device tilt and motion have not been used to select UI elements due to, among other things, the difficulties in precisely controlling the position of a cursor indicating the current placement of the user's selection in the user interface. Mobile devices commonly include accelerometers and gyroscopes with varying degrees of precision and accuracy. Such inertial sensors are used to flip or rotate the GUI relative to the orientation of the device, tag photos taken with the device as either being "landscape" or "portrait," to play various games where inertial motion is translated into in-game motion (e.g., steering in an automobile based on the tilt of the device), etc. However, the degree of control required and the coarseness of motion data acquisition have made selecting UI elements using tilt control impractical. Trying to position a cursor by tilting the device, without reworking the mechanics, is at best a frustrating and time-consuming experience.

To make tilt-control of a cursor practical, rather than requiring precise motion and steadiness to position a cursor on a UI element, the underlying mechanics of the GUI may be altered to make desired UI elements "attractive" to the cursor, while at the same time, making undesired UI elements easy to avoid accidently selecting. Without such a change to motion mechanics, jitter and small movements will cause the cursor to slide off an intended UI element target area or miss it entirely. Moreover, once the cursor is on a user-intended target area, selection of the UI element may be made without additional "touching" to avoid jarring the device and moving the cursor. The teaching herein may also enable easier one-handed operation of a mobile device.

Referring to the system in FIG. 1, three combinable and interrelated concepts may be applied to motion mechanics. The tilt control interface may be selectively activated (122) and deactivated. Changes in the orientation of the device 100 are translated into motion of the cursor. When the cursor is in proximity to UI elements (e.g., over an icon), a transform may be applied to a cursor-control coordinate system (124), altering cursor motion in a region associated with a UI element. The transformed cursor-control coordinate system is used to position the cursor, with the transformed coordinates mapping to the unaltered coordinate system of the GUI that appears on a display 116. The effect creates the appearance of a fictitious force changing how the cursor 250 moves as it intersects the UI elements such as illustrated icons 242, 244, 246.

A range of transformed coordinates surrounding the center of a UI element may map to a single point in the GUI coordinates as displayed—the center of the UI element. This region that maps to the center of the UI element serves a "target" region. In this target region, an artificial "drift" may be applied the cursor coordinates (126) to pull the cursor toward the center, thereby "holding" the cursor over the center of the UI element in the displayed GUI.

If the cursor remains over the center of a UI element in the displayed GUI (i.e., within the target region), the cursor's appearance may change to indicate that selection of the UI element is imminent, and change again to indicate that the UI element is selected (128) when the cursor remains there for a specified duration. For example, the cursor 250 may blink rapidly for a few hundred milliseconds, change colors, and/or alternate colors (e.g., change from a blue to blinking between green and blue colors). The speed of the blinking may increase to indicate that the UI element is about to be selected, and may change appearance again to briefly indicate that the UI element is selected (e.g., stop blinking and turn green). This provides the user positive feedback that the cursor is on the UI element and selection is in progress or has been completed.

An example of how a user may activate and deactivate the tilt-based interface is by pressing, a button 114 or other physical control on the device 100. When the button 114 is pressed, the cursor 250 appears. This prevents accidental UI element selection when, for example, the user is reading a web page. To select a hypertext or graphical link on the web page, the user presses the "trigger" button 114, moves the cursor 250 to the desired link by tilting the device 100, and holds the cursor on a center of the UI element for a specified duration of time such as a few hundred milliseconds to select the UI element. Other variations on button usage may also implemented. For example, the user may press the button 114 to activate the tilt-based interface, then push the button again to select a UI element, or the user may press-and-hold in the button 114 to activate the tilt-based interface and then release the button 114 to select a UI element. In addition to pressing the button 114 to turn the tilt interface off, the tilt interface may deactivate after a user selects a UI element.

To smooth the path of the cursor between UI elements, a low-latency filter such as a Kalman or similar filter is applied to the gyroscopic data. This filtering compensates for jitter caused by gyroscopic data coarseness, vibrations, user twitches, etc.

A user's head or face position, as captured by a camera or cameras 112, may be used in combination with tilt to control cursor movement. For example, to compensate for gyroscopic drift which may bias the cursor toward motion to one edge of the display 116 or another, a camera or cameras 112 of the device 100 may be used to identify a user's head, equalizing the motion of the cursor based on the position of the user's head relative to an orientation of the device. Cursor positioning may also be readjusted by the user by "bouncing" the cursor 250 along the edges of the display 116.

The coordinate system used by the cursor to navigate may be transformed (124) in each region proximate to a UI element. The transformed coordinate system is mapped to the untransformed coordinate system used by the GUI and/or display 116. This transformation acts like invisible hills and valleys of the GUI landscape, creating the appearance of a fictitious force changing how the cursor moves in proximity to each UI element. The coordinate system may be transformed so that a spacing between coordinates proximate to a periphery of the transform region is different than a spacing of coordinates proximate to a center of the transform region.

Figure 2:
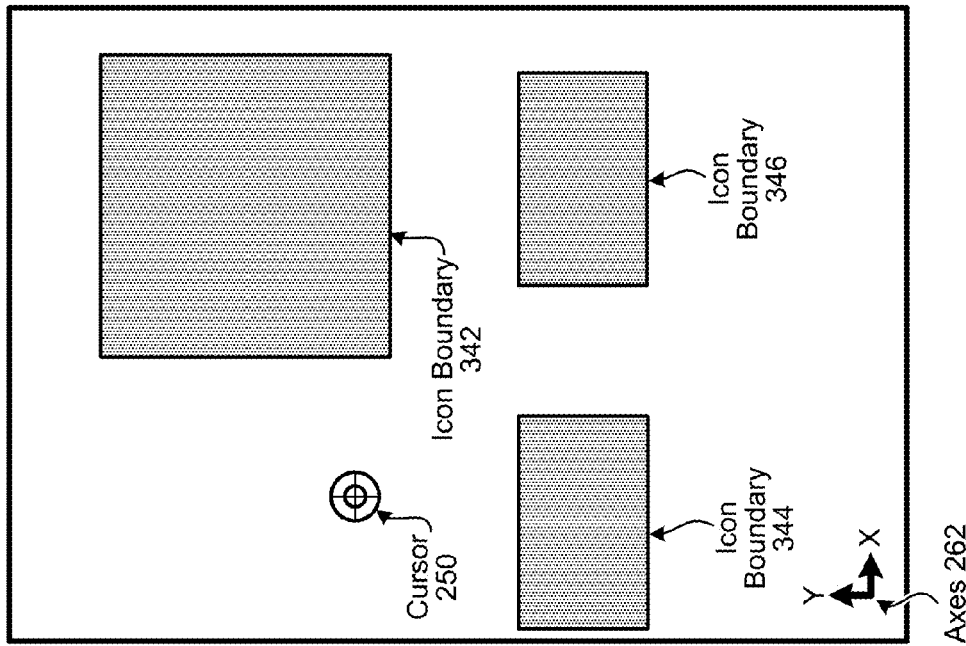
FIG. 2 illustrates an example graphical user interface on a display of the electronic device.

FIG. 2 illustrates the GUI from FIG. 1, and includes a plurality of user-selectable UI elements 242 to 246 and a cursor 250. UI element 242 represents an icon for a text message application that may include the text of an incoming message. When a user selects UI element 242, the text message application is launched. UI element 244 is an icon that, when selected, launches a weather application. UI element 246 is an icon that, when selected, launches a music application.

Any user-selectable element displayed in a GUI may serve as a user-selectable UI element, including icons, hypertext links, graphical links, buttons, etc. Pull-down menus, pop-up menus, multiple-choice fields may also be used, with a first UI element selection being the menu or field and a second UI element selection being one of the menu/field elements. Interfaces such as virtual scroll wheels, which are sometimes used on touch-interface devices to specify times, dates, territory, etc., may also be selected as a UI element, with the cursor being positioned over a scroll wheel to select the wheel, and then device tilt being used to make the wheel scroll up-or-down (with selection being set by, for example, how long a wheel selection remains without further change).

Figure 3:
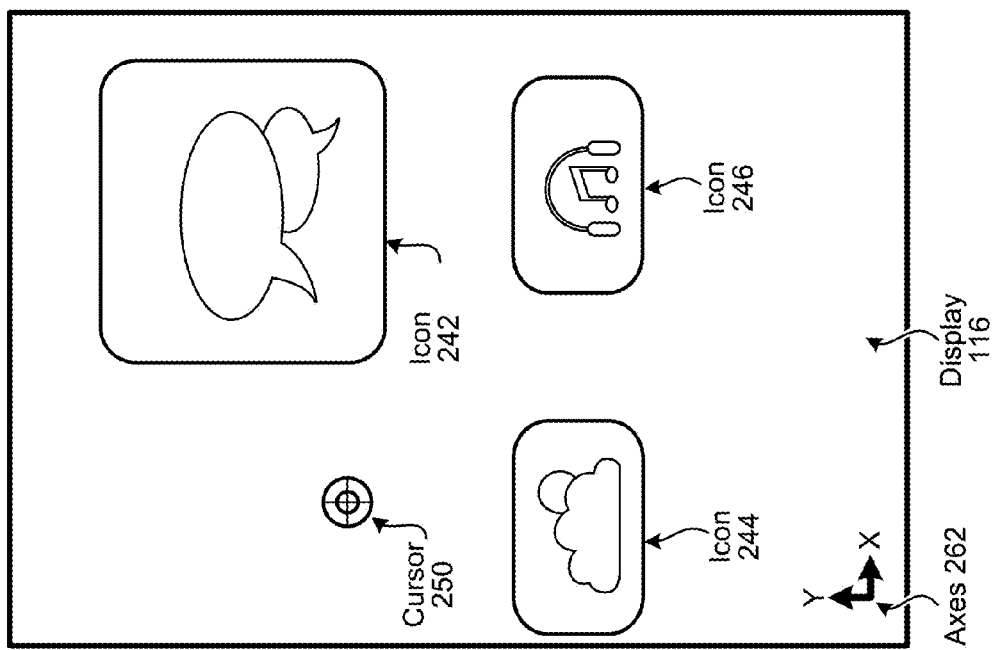
FIG. 3 illustrates an abstraction of the graphical user interface used for the selection of user interface elements.

FIG. 3 illustrates the UI element boundaries associated with each user-selectable UI element in FIG. 2. The boundaries may exist as abstract ranges of X-Y coordinates. While the edges of the exact shape of a UI element may be used as the UI element's boundary, rectangular boundaries are used in these examples because they can be resolved as rudimentary X-Y coordinates, simplifying computational complexity. Each UI element is represented. UI element boundary 342 is based on the edge/periphery coordinates of UI element 242 as displayed (e.g., max X, min X, max Y, min Y), UI element boundary 344 is based on the edge/periphery coordinates of UI element 244 as displayed, and so on.

These same boundaries may be used by a touch-based interface on the same device 100 to select the UI elements from the same GUI. For example, if a touch input falls within boundary 344, the touch will be associated with UI element 244, and if a touch input falls outside boundary 344, it will not be associated with UI element 244.

Figure 4:
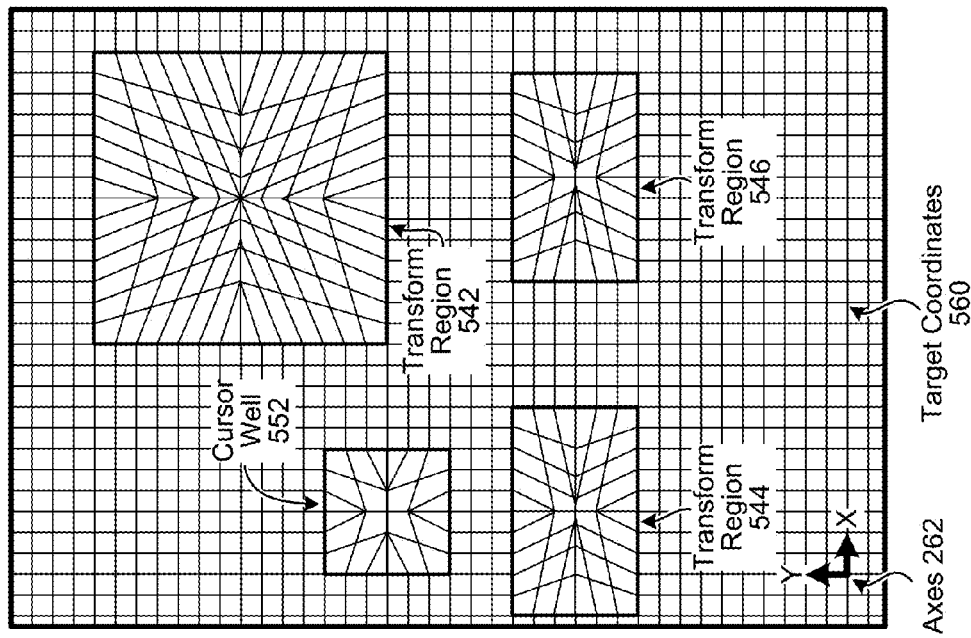
FIG. 4 illustrates a coordinate system associated with the graphical user interface.

The displayed GUI layer may be laid out with 1-to-1 coordinate mapping (i.e., having proportional distances between equivalent X coordinates and proportional distance between equivalent Y coordinates), and may be used, for among other things, to determine where on the display 116 each UI element will appear. FIG. 4 illustrates such GUI coordinates 460 as a grid pattern. If these coordinates were solely used for cursor 250 motion, a movement of "one" unit along the X or Y axis would result in the same movement in the respective direction without regard to location on the display 116.

Figure 5:
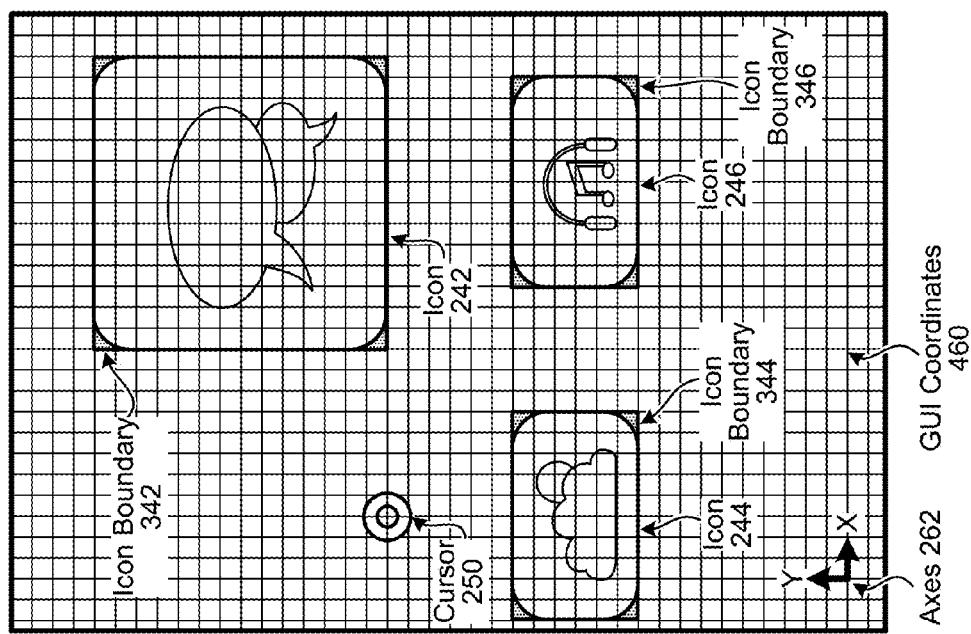
FIG. 5 illustrates an example of a coordinate system used by the cursor, where the coordinates have been transformed in regions where the graphical user interface contains user selectable interface elements.

FIG. 5 illustrates an example of the cursor-control "target" coordinates 560 of a cursor control subsystem that have been transformed (124) in each region including a UI element. The target coordinates 560 are a representation of positioning data used to control the cursor, but are an abstraction and are not coordinates underlying the GUI coordinate system 460 of the display. Rather, a position in the target coordinates 560 is translated or "mapped" to the GUI coordinates used by the display. In "transform regions," a mathematical "transform" or equation is applied to altering how the target coordinate position data is translated into GUI coordinates, thus altering the position and motion of the cursor as displayed. The transform regions are defined by equivalent boundaries in both the GUI coordinates 460 and the target coordinates 560.

"Untransformed" coordinates are areas outside of the transform regions where a position in target coordinates 560 is equivalent to a position in the GUI coordinates 460. For example, the grid areas outside of the transform regions in FIG. 5 correspond to the grid areas in FIG. 4. "Transformed" coordinates are coordinates where the mathematical transform is applied to the position data, altering the motion of the cursor in the GUI coordinates relative in comparison to how in the cursor would move in the untransformed coordinates.

In the example in FIG. 5, the boundaries of each coordinate transform region 542 to 546 corresponds to the boundaries of the respective UI element boundary 342 to 346 in the GUI coordinates 460. In this example, the coordinates create a "pull" on the cursor toward the center of the UI element.

Cursor 250 positioning and travel is based on a mapping of the target coordinates 560 to the GUI coordinates 460. In this example of a transformation, a movement of one unit inside a boundary of a transform region, near the boundary edge, results in a larger movement of the cursor as displayed than the same unit of movement would in the untransformed coordinates outside the boundary of the transform region. The transformation causes the coordinates to converge toward a center, with a range of coordinates resolving at the central X and Y axes of each region, such that a movement of one unit at a center of a coordinate transform region (e.g., 542) may not produce any movement of the cursor in the GUI, since multiple coordinates resolve to a same point. The effect of the coordinates of FIG. 5 is that once the cursor 250 enters a region, cursor motion speeds up as it is "pulled" by a force toward the center of the region. If the user does not alter the direction of travel, the overlapping coordinates holds the cursor, providing a "sticky" effect. As will be discussed further below, other transforms may be used. Also shown in FIG. 5 is a cursor well 552. The cursor well 552 is where the cursor 250 initially appears on the display 116 after the button 114 is pushed. The cursor well 552 may be demarcated by the displayed GUI (e.g., a shaded area or box), or may have no visible GUI counterpart. The target coordinates 560 within the cursor well 552 may be transformed like those of a region associated with a UI element, and may help avoid the cursor 250 darting across the display 116 as soon as it appears.

The coordinate transform applied to the cursor well 552 may be the same as that applied to the regions associated with the various UI elements, or may use a different coordinate transform. The location of the well may be specified by the GUI (e.g., by an application program), may be some preset location defined by the operating system, may be selected based on a calculation of where on a particular GUI is equidistant from the UI elements, may be placed in a central location or specific corner of the display where there are no UI elements, or some combination thereof. The cursor well 552 may be sized to assure that the effects of the transformed coordinates within the well are consequential to initial cursor motion. After the cursor 250 leaves the well 552, the well may remain or may be disabled, such that the original untransformed target coordinates are restored.

FIGS. 6A to 6C illustrate an example of how the coordinate transform may be applied to the tilt data. Each of these figures represents a different aspect of the process, with FIG. 6A illustrating raw input coordinate data based on the device's tilt motion, FIG. 6B illustrating the interplay of the coordinate transform and the coordinate data, and FIG. 6C illustrating the tilt motion as mapped the GUI in accordance with the coordinate transform. For purposes of illustration, the transform applied in the example of FIG. 6B is the same as was discussed with FIG. 5.

FIG. 6A illustrates raw input source coordinates 660. These coordinates correspond to the tilt motion translated into an X-Y coordinate system. Two examples are illustrated. First, if the initial cursor position is at coordinates 654*a* and tilt data corresponds to a cursor motion vector 658 of X+4, Y−4, the cursor coordinates change by four coordinate "units" to the right and four "units" down. Likewise, if the initial cursor position is at coordinates 654*b* along the periphery of a transform region 542, and the tilt data corresponds to a cursor motion vector 658 of X+4, Y−4, the coordinates change in the same way.

In FIG. 6B, the tilt data from FIG. 6A is applied to the target coordinates 560. If the initial coordinates 554*a* are in an untransformed area, then the cursor motion vector 658 of X+4, Y−4 result in the coordinates changing by four "units" to the right and four "units" down. This is also true if the initial cursor coordinates 554*b* are at a periphery of the transform region 542. However, the transformed coordinates result in four to the right and four down moving the cursor to the center of the transform region 542.

In FIG. 6C, when mapped from the target coordinates 560 to the GUI coordinates 460, starting at initial cursor coordinates 454*a* and moving X+4, Y−4 in accordance with the motion vector 658 produces the movement of four units to the right and four units down in the GUI coordinates. However, starting at initial cursor coordinates 454*b* at the periphery of the icon 242, applying the motion vector of X+4, Y−4 produces movement of seven units to the right and seven units down, placing the cursor at the center of the icon 242, increasing the rate (i.e., speed) of cursor motion in comparison to the rate exhibited by the equivalent motion vector 658 outside the transform region 542.

Since a portion of the transformed coordinates converge toward a center of the transform region 542, a range of input source coordinates (e.g., target 666 in FIG. 6A) map to a center of the corresponding icon 242. As can be seen by following the transformed coordinates in FIG. 6B, when the cursor coordinates fall within the target (666) box in FIG. 6A, the actual placement of the cursor 250 in the GUI coordinates 460 shown in FIG. 6C, will be the center of the UI element (e.g., icon 242).

FIGS. 6A to 6C also include a cursor motion vector 678 of X+8, Y+0 to demonstrate how the converging coordinates alter a direction of motion to be toward a center of the transform region 542. When the tilt data from FIG. 6A is applied to the target coordinates 560 in FIG. 6B, the path that the cursor follows the converging coordinates inside the transform region 542. When mapped from the target coordinates 560 to the GUI coordinates 460, as shown in FIG. 6C, the direction of cursor motion follows the altered path, the direction over the icon 242 changing to be toward a center of icon 242. Also, although half the of the motion vector (i.e., X+4, Y+0) falls outside of the transform region 542 and half inside (in terms of the raw input source coordinates 660), as illustrated in the example in FIG. 6C, while the untransformed half of the motion vector outside the transform region 542 produces a proportional movement of X+4, Y+0, the half of the motion vector inside the transform region 542 produces an apparent movement in the "X" direction of the GUI coordinates 460 greater than four, as well movement in the "Y" direction greater than zero.

The transformed and untransformed coordinates are continuous, as is the movement path of the cursor, such that the cursor does not jump from one location to another. Also, while cursors are illustrated in FIGS. 6A and 6B, neither figure represents an output graphical interface, and the cursor graphic is merely included for demonstration of relative cursor coordinates.

An example of portions of code written in the Java language to produce the transform illustrated in FIG. 6B is presented for reference, although the coordinate spacing of the target coordinates 560 is different than the scale of coordinates discussed with the code.

A first section gets the fraction of the distance in form the edge to the center point in the GUI coordinates (for example, if "fracx" is zero, the GUI coordinate is on the left or right edge of the transform region). "TARGETEDGE" is 0.7, the fraction of the distance from the center that is not in the center, demarcating the boundaries of the target 666 (for example if the transform region goes from x=100 to x=300, then 100 to 170 are in the transform region but outside the target, 170 to 230 are in the target 666 and map to the center of the UI element, and 230 to 300 are in the transform region but outside the target 666).

Variables "locX" and "locY" are the coordinates in the GUI coordinate system:

```
Rect t = targetRects.get(i);
double dx = Math.abs(locX - t.centerX( ));
double dy = Math.abs(locY - t.centerY( ));
double scaleUp = 1.0 / TARGETEDGE;
// fraction of the distance from the edge (0) to the center (1) on each axis
double fracx = (1.0 - dx / (t.width( ) / 2.));
double fracy = (1.0 - dy / (t.height( ) / 2.));
```

Mapping scales up the distance from edge to center (zero-to-one is scaled to zero-to-approximately 1.4), then limits the range to zero-to-one (this makes all values between one to approximately 1.4 map to a single point). Delx and dely are the mapped x and y offsets, then the offsets are applied to the original GUI coordinates, where "bdLoc" is the current location of the cursor:

```
// map the edges
double delx = (Math.min(scaleUp * fracx, 1) - fracx) * dx * fracy;
double dely = (Math.min(scaleUp * fracy, 1) - fracy) * dy * fracx;
// shift x toward center - more shift if closer
if (locX > t.centerX( )) {
  bdLoc.x = (int)(locX - delx);
} else {
  bdLoc.x = (int)(locX + delx);
// shift y toward center - more shift if closer
if (locY > t.centerY( )) {
  bdLoc.y = (int)(locY - dely);
} else {
  bdLoc.y = (int)(locY + dely);
}
```

Further, referring to FIG. 6A, to hold the cursor over the center of a UI element, when the coordinates correspond to coordinates within the target 666, a drift may be added to pull the cursor toward the center. The device 100 may produce gyroscopic sensor data several hundred times a second. Each time a sensor "tick" occurs where the cursor coordinates map to within the target, a fraction of the distance to the center of the target 666 may be added to the coordinates. For example, if 25% of the distance between the coordinate location and the center is added/subtracted each sensor tick, then if the cursor is at the edge of the target 666, on the next sensor tick, the cursor coordinates would be moved to 75% of the distance between the edge and the center, on the next sensor tick the cursor coordinates would move another 25% to 56.25% of the distance between the edge and the center, then to 42.19%, then to 31.64%, and so on. This tug does not move the cursor on the display, since all coordinates within the target 666 map to a center of the UI element 242, but serves to "hold" the cursor over the center. However, the cursor will still release from the center if the user applies sufficient tilt. As an alternative, this drift could be applied for an entirety of the transform region 542, such that the drift toward the center begins as soon as the cursor enters the region 542.

Figure 7:
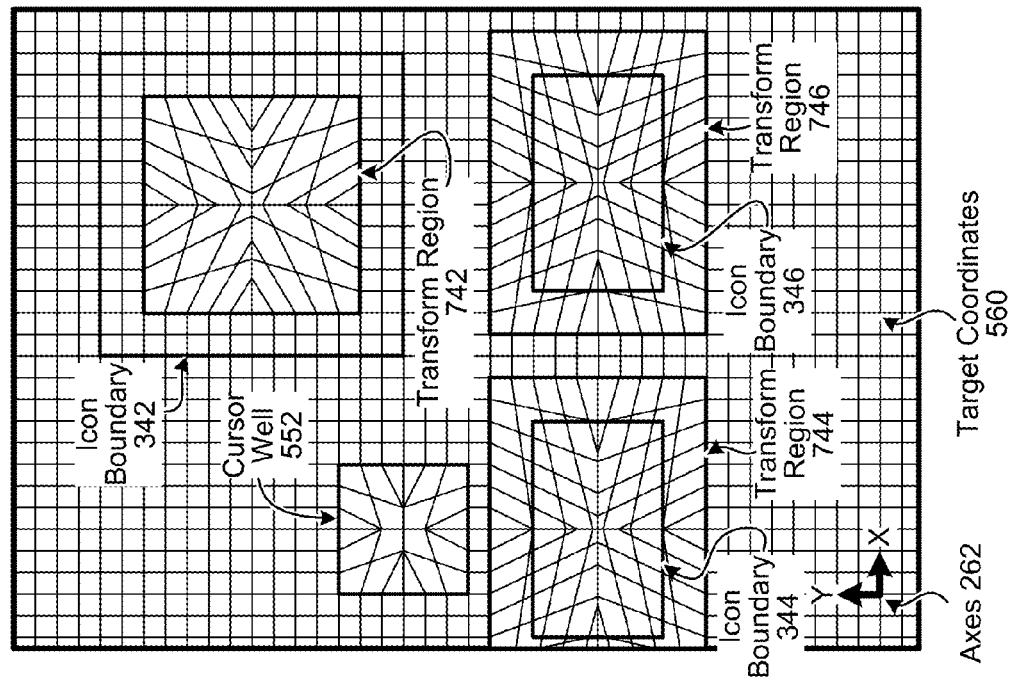

FIG. 7 illustrates additional ways the UI element boundaries and coordinate transform regions may overlap. In FIG. 7, each coordinate transform region is selectively expanded and contracted relative to its corresponding UI element. When a UI element such as icon 242 takes up a large proportion of the display, it may be beneficial to make the transform region 642 smaller than the UI element boundary 342 to make it easier to avoid accidently hitting and navigate around the UI element 242 when using a tilt control system to move the cursor. Conversely, when an UI element is relatively small, it may be beneficial to expand the coordinate transform region, such a transform regions 644 and, to encompass more than just their respective UI element boundaries 344 and 346, causing cursor 250 motion to change before reaching the corresponding UI element 244 to 246 in the GUI. This expansion may be particularly beneficial for selecting UI elements which are otherwise difficult to access, such as text links embedded in a web page.

Figure 8:
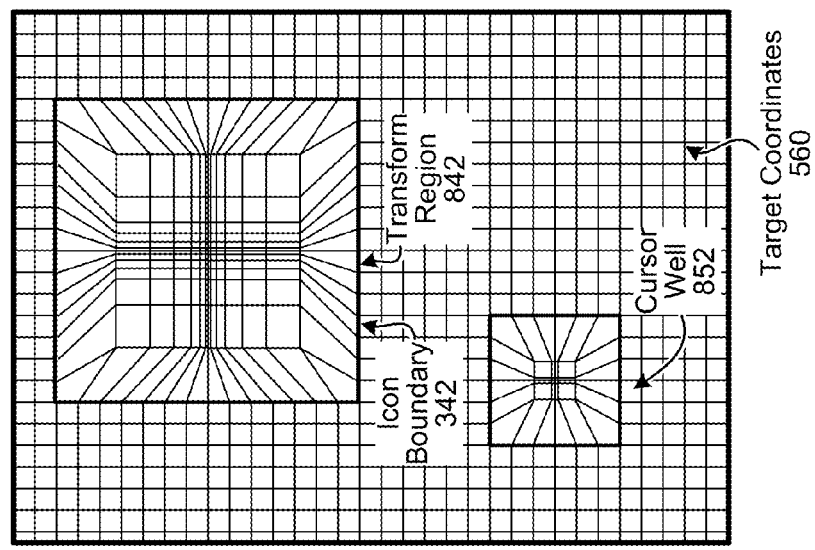
FIGS. 7 to 10 illustrate further examples of coordinate systems used by the cursor, where the coordinates have been transformed in regions where the graphical user interface contains user selectable interface elements.
Figure 10:
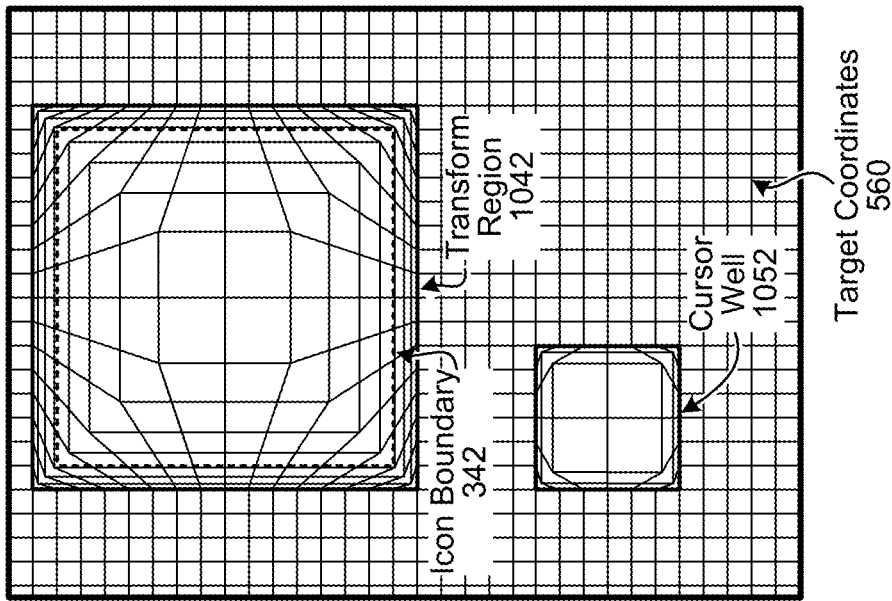
Figure 9:
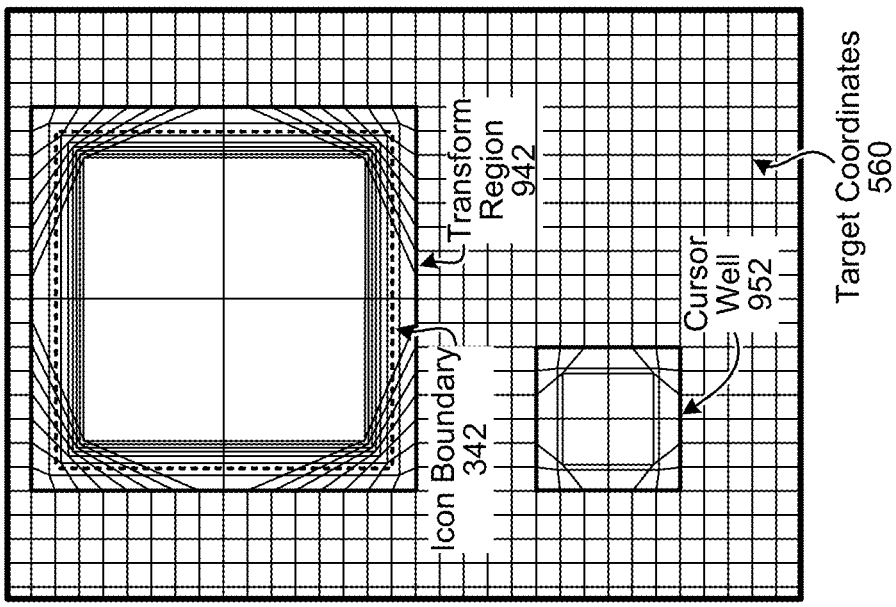

FIGS. 8 to 10 illustrate additional examples of transformed coordinates that may be applied to the regions and/or cursor wells. In the example in FIG. 8, the coordinate transform regions 842 corresponds to the boundaries of the UI element boundary 342. In the examples in FIGS. 9 and 10, the coordinate transform regions 942 and 1042 expand past their associated UI element boundaries 342. In all three examples, these transforms may apply to arrangements where the UI element boundary and transform region are the same size (e.g., transform region 542 in FIG. 5) or where the transform region is larger than the UI element boundary (e.g., transform regions 744 and 746 in FIG. 7), or where the transform region is smaller than the UI element boundary (e.g., transform region 742 in FIG. 7).

In FIG. 8, the transform applied a gradient to the coordinates. The coordinates are expanded toward a periphery of the transform region 842 and compressed toward the center, relative to the untransformed target coordinates 560. Movement of one unit at a periphery of a coordinate transform region 842 results in a larger movement than the same unit of movement would in the untransformed target coordinates 560. Likewise, a movement of one unit at a center of the region results in smaller movement than the same unit of movement would in the untransformed coordinates. As a result, when the cursor 250 initially enters the region 842, it will speed up as it moves toward the center, and then move more slowly (in comparison to the untransformed coordinate the untransformed coordinates outside the region and the expanded coordinates at the periphery) in proximity to the dense coordinates at the center.

In FIG. 9, the coordinates at the boundary of the transform region 942 are compressed relative to the untransformed target coordinates 560. In the direction of the center of the region, the coordinates become even more compressed. Then the coordinates expand to the center. As shown, the expansion begins within the UI element boundary 342. However, the expansion may not be adjacent to the boundary 342, but rather, may begin at some other location (e.g., half-way between the periphery and center of the UI element boundary). The effect is that the cursor 250 becomes increasingly slower after it enters the expanded coordinate transform region 942. As the cursor approaches the associated UI element 242, the user is provided an opportunity to change the direction of motion, since the cursor 250 must overcome this speed "hump" around the periphery. Likewise, exiting the region 942 from the center requires a sustained "tilt" motion to move away from the associated UI element 242. The expanded coordinates toward the center of the UI element boundary 342 cause the cursor 250 to move quickly across the face of the associated UI element 242 once over the "hump," leaving the cursor 250 to bounce back and forth across the face of the UI element 242.

FIG. 10 applies a gradient transform based on an arrangement opposite that of FIG. 8. Like FIG. 9, the coordinates along a periphery of the transform region 1042 are compressed relative to the untransformed target coordinates 560. But then, in a direction of the center, the coordinates gradually expand. As in FIG. 9, the coordinates around a periphery of the coordinate transform region 1042 provide the cursor 250 a "hump" to be overcome to move toward a center of the UI element 242.

As noted before, while the coordinates of cursor wells 852, 952, and 1052 are transformed in a same way as the regions corresponding to the UI elements, different transforms may also be applied.

Figure 11:
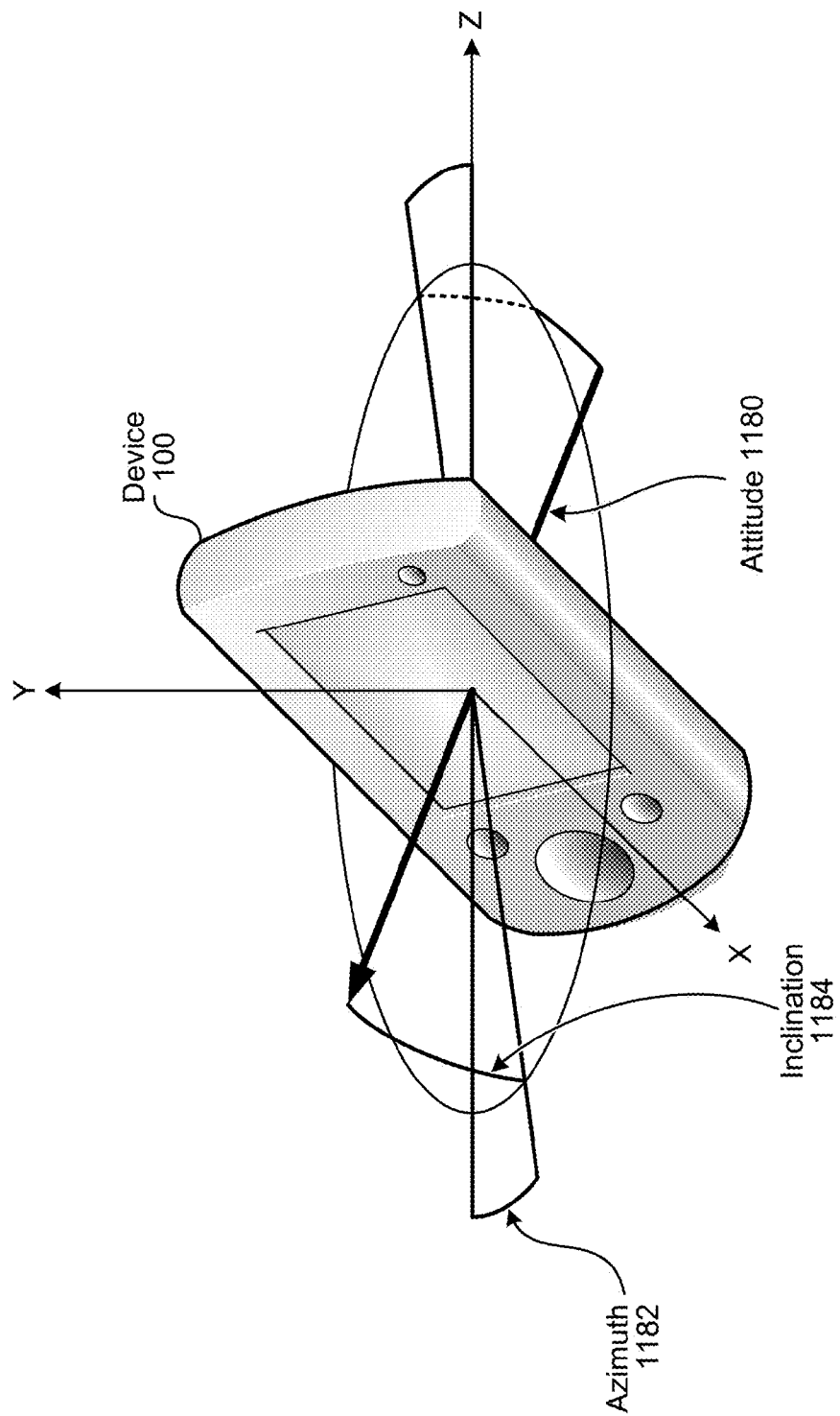
FIG. 11 illustrates using the attitude of the tilted device.

FIG. 11 illustrates the device 100 pivoting around three-dimensional axes. The X-Y-Z coordinate system may be relative to the device 100 or may be based on the actual orientation of the device 100. Actual orientation may be determined based on, for example, directional navigation data from a Global Positioning System receiver, a GLONASS receiver, and/or a magnetometer (compass), and orientation of the Y-axis may be aligned based on the direction of gravity using data from a gravity sensor and/or a three-axis accelerometer. Whether orientation is relative or actual, the camera or cameras 112 may be used to equalize cursor motion (as will be discussed below).

Changes in orientation to the device 100 (i.e., "tilting") as illustrated in FIG. 11 may control movement of the cursor 250 in the tilt-based user interface. For example, a device movement sensor module (1374 in FIG. 13) may provide data corresponding to changes to an attitude vector 1180 of the device 100. The attitude vector 1180, as shown in FIG. 11, may be orthogonal/perpendicular to a face of the display 116. Changes in attitude 1180 may be translated into changes in azimuth 1182 and inclination 1184. A change in azimuth 1182 may correspond to the tilt angle in the X-Z plane, and may be translated directly into a proportional change of movement along the X axis in the transform coordinates 560. For example, ten degrees may be translated into a movement of ten coordinate units. Likewise, a change in inclination 1184 may be translated directly into a proportional change in movement along the Y axis in the transform coordinates 560. As an alternative to azimuth 1182 and inclination 1184, the raw changes in angular velocity output by the device movement sensor module (1374 in FIG. 13) may be translated proportionally into movement along the axes 262. Motion calculations may be adjusted if device orientation changes between portrait and landscape.

Cursor motion may be limited to the boundaries of the display 116, such that the cursor 250 never goes "off screen." A user may thus reorient the tilt angle using the screen edge. For example, if the device 100 is tilted too much for the user to accomplish their objectives, the user may "bump" the cursor 250 along the edge of the GUI on the display 116 to reorient the center. For example, if an arc of ten degrees in inclination 1184 (i.e., from plus five from center to minus five from center) corresponds to movement from one edge of the GUI to the other along the Y axis, then bumping the cursor along the edge of the screen to an angle fifteen degrees may negate the extra ten degrees, such that tilting the device back five degree in the opposite direction may place the cursor back at the center. Other configurations may also be used.

Figure 12A:
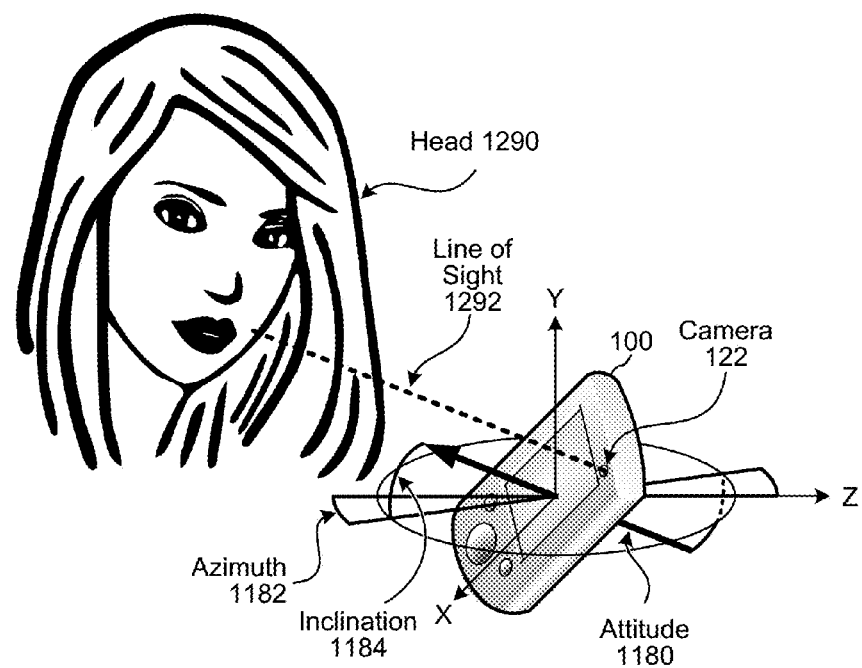
FIGS. 12A to 12C illustrate using image processing to equalize the attitude of the tilted device.
Figure 12B:
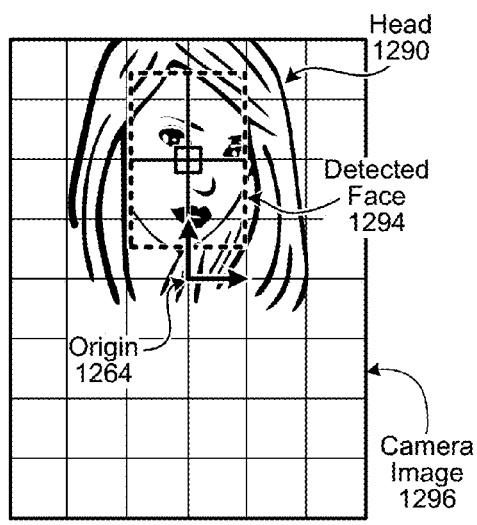
Figure 12C:
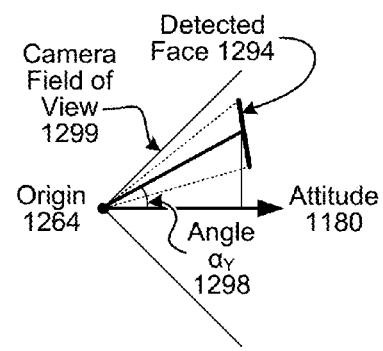

FIGS. 12A to 12C illustrate equalizing cursor motion based on a position of a user's head 1290 relative to the orientation of the device. In practice, a combination of head movement and tilt may be used to control the device 100. The position of the user's head 1290 is determined relative to the line of sight 1292 of the camera or cameras 112. The initial position of the user's head, relative to the attitude 1180 of the device, may be used to zero the initial velocity of the cursor when it is first turned on.

During cursor operation, head position may be used to compensate for gyroscopic drift and changes in a user's orientation. For example, the angle of the device (e.g., attitude 1180) relative to the user's head 1290 may be used to determine where to move the cursor. To determine the angle $\alpha_Y$ (as shown in FIG. 12C relative to Y axis) between the position of a user's head 1290 and the device's attitude 1080, the distance between the device and the user's head 1290 may be calculated. For example, in FIG. 12B, a size of a user's detected face 1294 may be compared to a standard "reference" face or head size to approximate the distance between a user's head 1290 and the device 100. A similar determination may be made for $\alpha_X$ relative to the X axis (not illustrated). As another approach, if the device 100 includes two cameras 112 pointed toward the user, parallax can be used to determine the distance to the user's head 1290 and the approximate angle $\alpha_Y$.

Once the distance between the user's head 1290 and the device 100 is known, the approximate angle $\alpha_Y$ 1298 may calculated in a variety of ways. For example, in FIG. 12B, the distance between the origin 1264 and the center of the detected face 1294 in the camera image 1296 may be scaled proportionally based on the proportions between the size of the detected face 1294 and a reference face size. The approximate angle $\alpha_Y$ 1298 may be determined by dividing that value by the distance from the origin 1264 to the detected face and taking the arcsine. As another example, the angle $\alpha_Y$ 1298 may be calculated based on the proportion of the field of view 1299 occupied by the detected face 1294.

If the device's tilt changes, the angles measured based on data from the device movement sensor module and the camera should match. If they do not, the device movement sensor module may be calibrated using angle calculations from the camera(s) 112. If the device movement sensor module continually needs correction, tilt control may be performed using only the camera(s) 112. Likewise, if no face or head is detected, tilt control may be based entirely on the device movement sensor module.

Also, head and face detection may sometimes detect false-positives as another kind of error, such as when a bright light or other shape results in a mistaken reading. So gyroscopic data is always available, but may contain drift errors, while head/face detection is sometimes available, but may produce false positives. Therefore, in addition to using face/head detection to calibrate gyroscopic data, another approach is to combine or average these two data sets, with outlier reading rejected as presumptively including errors. As another alternative, control may be primarily driven by head/face detection, with gyroscopic data being used to fill in gaps when face/head detection fails.

Figure 13:
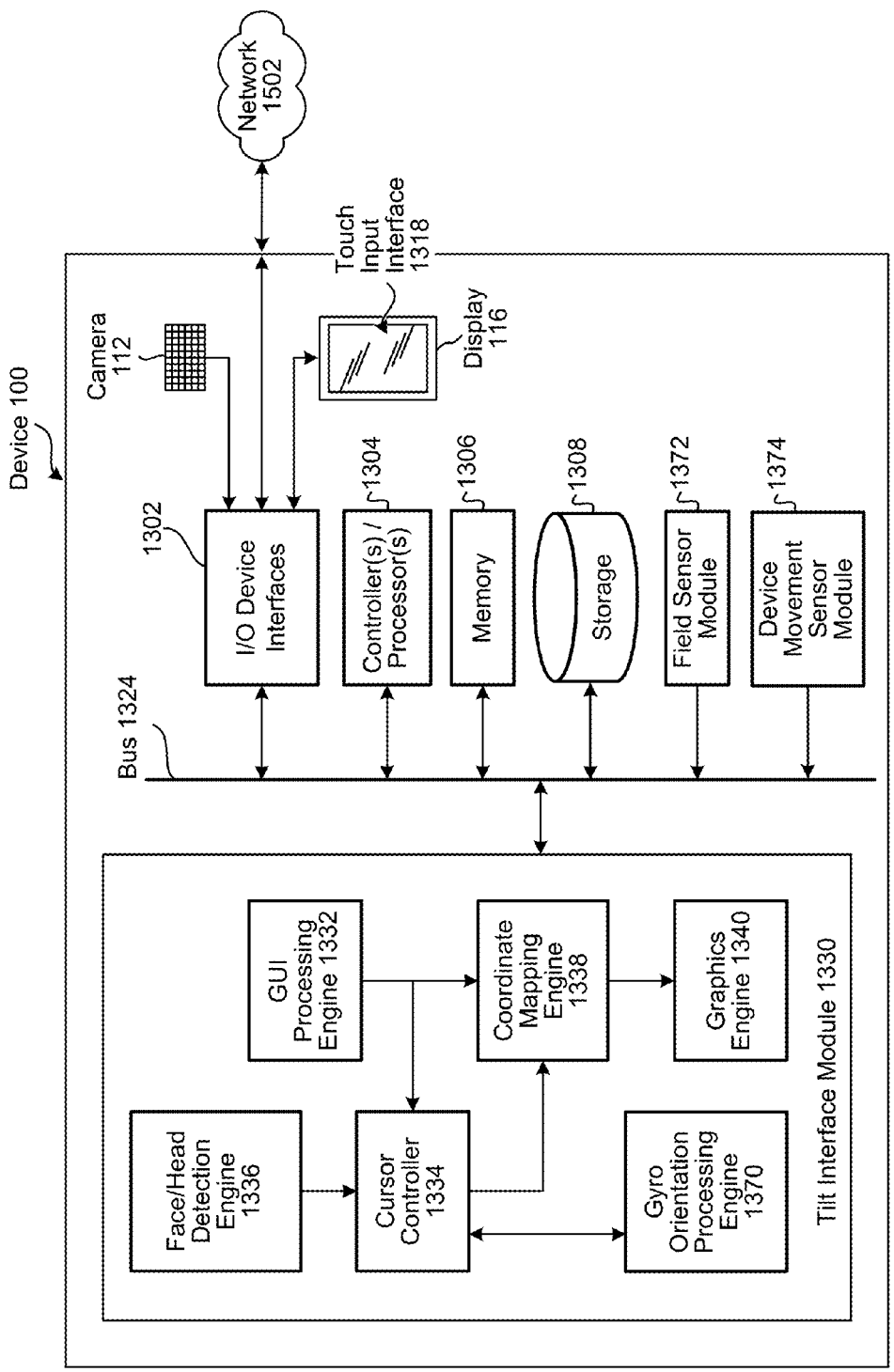
FIG. 13 is a block diagram conceptually illustrating the device providing the tilt-based user interface.

FIG. 13 is a block diagram conceptually illustrating the device 100 providing the tilt-based user interface. Aspects of the components of device 100 may include instructions executable by controller/processor 1304 that may reside in memory 1306 and/or storage 1308.

FIG. 13 illustrates a number of components that may be included in the device 100. Other non-illustrated components may also be included. Also, some of the illustrated components may not be present in every device capable of employing the tilt-based user interface. Further, some components that are illustrated as a single component may appear multiple times in a single device. For example, the device 100 may include multiple input/output device interfaces 1302 or multiple controllers/processors 1304. The device 100 as illustrated in FIG. 13 is exemplary, and may be a stand-alone device or may be included, in whole or in part, as a component of a larger device or system.

As illustrated in FIG. 13, the device 100 may include a camera or cameras 112, such as a charge-coupled device (CCD) image sensor or an active-pixel sensor (APS) for capturing an image; a display 116 such as a liquid crystal display, an organic light emitting diode display, electronic paper, an electrochromic display, a field emission display, or other suitable component for displaying images and/or video; a touch input interface 1318, such as a capacitive or resistive interface; and a button 114 (shown in FIG. 1). The input/output components may be integrated together with the processing components, or be housed separately.

The device 100 may include an address/data bus 1324 for conveying data among the various components. Each component within the device 100 may also be directly connected to other components in addition to (or instead of) being connected to other components across the bus 1324.

The device 100 may include one or more controller(s)/processor(s) 1304 that may each include one or more central processing units (CPUs) for processing data and computer-readable instructions, and a memory 1306 for storing data and instructions. The memory 1306 may include volatile random access memory (RAM), non-volatile read only memory (ROM), non-volatile magnetoresistive (MRAM) and/or other types of transitory and non-transitory memory. The device 100 may also include a non-volatile, non-transitory data storage component 1308, for storing data and instructions. The data storage component 1308 may include one or more storage types such as magnetic storage, optical storage, solid-state storage, etc. The device 100 may also be connected to removable or external memory and/or storage (such as a removable memory card, memory key drive, networked storage, etc.) through the input/output device interfaces 1302. Computer instructions for processing by the controller/processor 1304 for operating the device 100 and its various components may be executed by the controller/processor 1304 and stored in the memory 1306, storage 1308, or an external device. Alternatively, some or all of the executable instructions may be embedded in hardware or firmware in addition to or instead of software.

The device 100 includes input/output device interfaces 1302. A variety of components may be connected through the input/output device interfaces 1302, such as the camera(s) 112, button 114, display 116, and touch interface 1318. The input/output device interfaces 1302 may also include an interface for an external peripheral device connection such as universal serial bus (USB), FireWire, Thunderbolt or other connection protocol. The input/output device interfaces 1302 may also include a connection to a network 1502 via an Ethernet port, a wireless local area network (WLAN) (such as WiFi) radio, or wireless network radio, such as a radio capable of communication with a wireless communication network such as a Long Term Evolution (LTE) network, WiMAX network, 3G network, etc. Through the network 1502, the device 100 may connect to a distributed computing environment.

The device 100 also includes device movement sensor module 1374. The device movement sensor may include a gyroscope, accelerometer, or other movement sensor. This module provide inertial data, such as data from a 3-axis accelerometer and a 3-axis gyroscope. A field sensor module 1372 may also be included, such as a gravity sensor and a magnetometer that measures the ambient magnetic field along the x, y, z axes of the device. Such magnetometers are conventionally used to provide compass bearings. Other field sensors may also be included.

The device 100 further includes a tilt interface module 1330. Components of the tilt interface module 1330 include a GUI processing engine 1332 that identifies the UI element boundaries and defines or specifies the regions for coordinate transformation, the cursor controller 1334 that translates data from the device movement sensor module 1374 into cursor motion, the face/head detection engine 1336 that performs face/head identification, the coordinate mapping engine 1338 that maps the cursor position in transformed coordinates to the GUI, and the graphics engine 1340 that outputs the GUI and cursor to the display 116. In operation, the cursor controller 1334 may receive raw data from the device movement sensor module 1374, or may be provided the attitude 1180 of the device 100 already processed into azimuth 1182 and 1184 (for example, if the device includes a strapdown inertial navigation engine).

The face/head detection engine 1336 may use pattern detection techniques to detect the head or face, which is illustrated in FIG. 12B as the rectangle 1294. The pattern detection techniques may be basic shape matching or a facial detection algorithm may be used. The gyro orientation processing engine 1370 may preprocess the gyroscopic data and perform drift compensation if gyroscopic data does not match tilt data based on the camera(s). Calculation of the tilt angles based on the data from the face/head detection engine 1336 may be performed by the cursor controller 1334, the gyro orientation processing engine 1370, or some other component.

Figure 14:
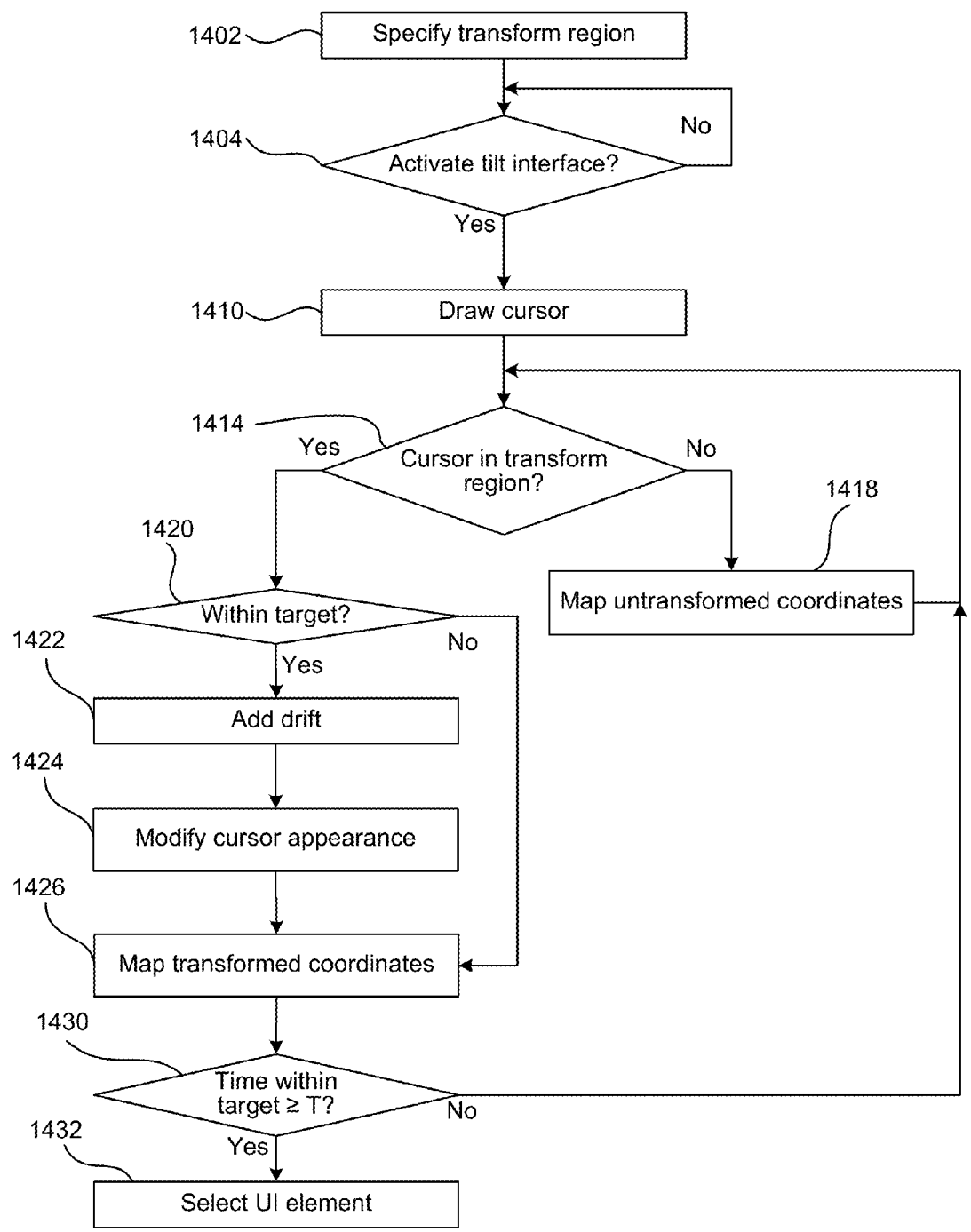
FIG. 14 illustrates a process for generating the tilt-based user interface for the electronic device.

FIG. 14 illustrates a process for generating and operating the tilt-based user interface. The GUI processing engine 1332 processes each UI element and specifies transform regions (1402) for each UI element.

The device 100 may wait for a press of the button 114 or other indicia to active (1404) the tilt interface. If the button 114 or other indicia is repeated, the tilt interface may turn off (which may be noted by the disappearance of the cursor). In parallel (not illustrated), the device 100 may monitor for a touch by a user corresponding to a UI element to otherwise control the device 100.

If the tilt interface is activated (1404 "Yes"), such as a result of button 114 being pressed, the cursor controller 1334 activates the cursor (1410), with coordinates for the cursor being relayed to the graphics engine 1340 for inclusion in the GUI via coordinate mapping engine 1338. The cursor controller may also activate the cursor well, and may deactivate the cursor well after the cursor leaves it.

This identification of transform regions (1402) may occur before or after the indication from the user to activate the tilt interface (e.g., a press of button 114).

The cursor controller 1334 also compensates for drift and may apply a filter to the motion vector of the cursor 250. Correcting for drift may include use of the camera(s) 112, as discussed with FIGS. 12A to 12C, equalizing cursor motion based on head motion. The filter, such as a Kalman or similar filter, reduces the impact of jitter in the gyroscopic data on cursor motion.

If the cursor coordinates are not within a coordinate transform region (1414 "No"), the cursor controller maps untransformed tilt motion data (1418) to the GUI coordinates. If the cursor coordinates are within a transform region (1414 "Yes"), and is within a target (i.e., 666) that maps to the center of the UI element (1420 "Yes"), the cursor controller adds drift to pull the cursor toward the center (1422) and maps the transformed coordinates to the GUI (1426). Otherwise, if the cursor coordinates are not within a target (1420 "No"), the cursor controller maps the transformed coordinates to the GUI (1426). In the alternative, step 1420 may be omitted, adding drift (1422) toward the center for all locations within the transform region.

When the cursor is within a target (1420 "Yes"), the cursor may be modified (1424) to visually indicate to the user that the countdown for selection of the UI element corresponding to the target has begun, as discussed above with selection (128) in FIG. 1. For example, the cursor may blink rapidly for a few hundred milliseconds, change colors, and/or alternate colors (e.g., change from a blue to blinking between green and blue colors). The speed of the blinking may increase to indicate that the UI element is about to be selected, and may change appearance again to briefly indicate that the UI element is selected (e.g., stop blinking and turn green).

If the cursor remains within the target (1430 "Yes") for at least a specified duration of time "T", the UI element corresponding to the target is selected (1432).

Further, steps illustrated in FIG. 14 may be performed in an order different from that illustrated. Also, some of the steps in FIG. 14 may be omitted and some steps not shown may be added in some variations of the illustrated process.

Figure 15:
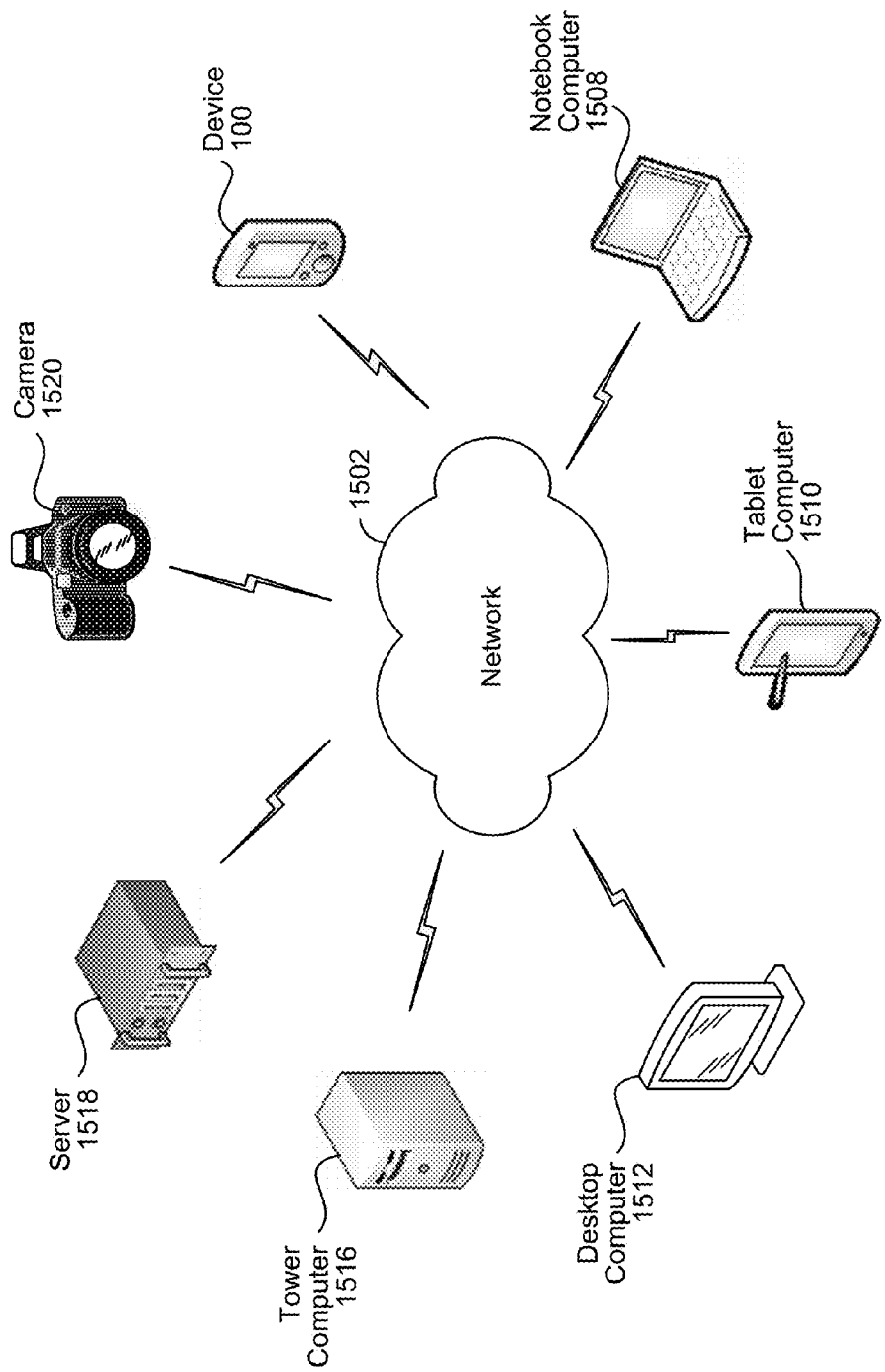
FIG. 15 illustrates an example of a computer network for use with the tilt-controlled device.

The concepts of the tilt-based user interface may be implemented by individual software applications and web browsers, and/or may be implemented as part of an operating system library. Referring to FIG. 15, these concepts may be applied within a number of different devices and systems, including, for example, digital cameras 1520, cellular phones, personal digital assistants (PDAs), tablet computers 1510, wearable computers with a head-mounted camera and display, other mobile devices, etc. The device 100, in a distributed computational environment, may include components distributed across a notebook computer 1508, a desktop computer 1512, a tower computer 1516, and a mainframe/server 1518. For example, the image processing engine 1336 may be located on a server 1518 separate from the device 100.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, digital imaging and/or content conversion, should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

As used in this disclosure, the term "a" or "one" may include one or more items unless specifically stated otherwise. Further, the phrase "based on" is intended to mean "based at least in part on" unless specifically stated otherwise.

What is claimed is:

1. A method of navigating a graphical user interface (GUI) by changing an orientation of a device, comprising:
    displaying the GUI, the GUI comprising a first coordinate system, a cursor and a user-selectable icon, the cursor located at a first position in the first coordinate system, wherein the first coordinate system is an unaltered coordinate system of the GUI;
    receiving an indication from a user to activate a cursor control interface, where cursor motion is at least partially based on changes in orientation of the device;
    detecting a first change in an orientation of the device;
    converting the first change in the orientation of the device into a second change in coordinates of a second coordinate system to be mapped to the first coordinate system, wherein the second coordinate system is a transformed cursor-control coordinate system to adjust the position of the cursor based on the second change, the second change to be mapped in the first coordinate system;
    mapping the second change from the second coordinate system to the first coordinate system to move the cursor based on the second change, wherein:
        in response to the cursor not being over the user-selectable icon, the mapping comprises translating the second change in coordinates in the second coordinate system into a first cursor motion in the first coordinate system that is proportional to the first change in the orientation of the device while the first cursor motion is not over the user-selectable icon, and in response to the cursor being over the user-selectable icon, the mapping comprises applying a mathematical transform to translate the second change in coordinates in the second coordinate system into second cursor motion in the first coordinate system that is not proportional to the first change in the orientation of the device while the cursor is over the user-selectable icon, wherein the mathematical transform alters the movement of the cursor in the second coordinate system such that the cursor appears to be pulled to the center of the user-selectable icon in the first coordinate system and the cursor remains at the center in response to a small change in device orientation; and selecting the user-selectable icon in response to the cursor remaining on the user-selectable icon for a specified duration of time.

2. The method of claim 1, wherein applying the mathematical transform further results in the cursor moving to a new position in the first coordinate system closer to a center of the user-selectable icon than indicated by the second change in coordinates in the second coordinate system, resulting in movement of the cursor over the user-selectable icon pulling the cursor toward the center of the user-selectable icon.

3. The method of claim 2, wherein applying the mathematical transform maps a range of coordinates in the second coordinate system to the center of the user-selectable icon, resulting in a small change in device orientation not causing the cursor to move off the center of the user-selectable icon when the second change in coordinates of the second coordinate system is within the range.

4. The method of claim 3, wherein applying the mathematical transform maps coordinates in the second coordinate system to coordinates in the first coordinate system within the range to require a greater change of device orientation to move the cursor away from the center of the user-selectable icon when the cursor is closer to the center of the user-selectable icon than when the cursor is farther from the center of the user-selectable icon.

5. A computing device comprising:
   a display;
   a device movement sensor;
   at least one processor;
   a memory including instruction operable to be executed by the at least one processor to perform a set of actions, configuring the at least one processor to:
   display a graphical user interface (GUI) on the display, the GUI comprising a cursor at a position in a first coordinate system and a user-selectable interface element, wherein the first coordinate system is an unaltered coordinate system of the GUI;
   detect a first change in orientation of the computing device based at least in part on data from the device movement sensor;
   converting the first change in orientation of the computing device into a second change in coordinates of the cursor in a second coordinate system, wherein the second coordinate system is a transformed cursor-control coordinate system to adjust the position of the cursor based on the second change, the second change to be mapped to the first coordinate system;
   move the cursor in the first coordinate system based on the second change in orientation;
   associate a region of GUI with the user-selectable interface element, the cursor moving differently inside the region in comparison to outside the region relative to a same change in the orientation of the computing device,
   wherein:
   in response to the cursor being outside the region, the at least one processor translates the second change in orientation into movement of the cursor that is proportional to the second change, and
   in response to the cursor being inside the region, the at least one processor applies a mathematical transform to translate the second change in orientation into movement of the cursor that is not proportional to the second change; and
   alter movement of the cursor inside the region of the GUI associated with the user-selectable interface element to pull the cursor toward a center of the user-selectable interface element, wherein a small change in device orientation will not cause the cursor to move when the cursor is at the center.

6. The computing device of claim 5, the at least one processor further configured to:
   select the user-selectable interface element in response to the cursor remaining over the user-selectable interface element for a specified duration of time.

7. The computing device of claim 5, the computing device further comprising a button, the at least one processor further configured to:
   select the user-selectable interface element in response to a signal indicating an interaction with the button while the cursor is over the user-selectable interface element.

8. The computing device of claim 5, the computing device further comprising a camera, wherein the at least one processor is further configured to:
   identify an object as a head or face using the camera;
   detect a change in a position of the identified object; and
   compare the detected change in the position of the identified object with data from the device movement sensor,
   wherein the detected change in orientation of the computing device is further based on the detected change in the position of the identified object in response to the data from the device movement sensor being inconsistent with the detected change in the position of the identified object.

9. The computing device of claim 5, wherein an area of the region associated with the user-selectable interface element is larger or smaller than an area of the user-selectable interface element.

10. The computing device of claim 5, the at least one processor is further configured to:
    receive a first indication to activate orientation-based cursor control;
    move the cursor based on the detected change in the orientation of the computing device in response to receiving the first indication;
    receive a second indication to deactivate orientation-based cursor control; and
    discontinue moving the cursor based on the detected change in the orientation of the computing device in response to receiving the second indication.

11. The computing device of claim 5, the at least one processor further configured to:
    convert the detected change into the second change in coordinates of the second coordinate system to be mapped to the first coordinate system, wherein the second change in coordinates of the second coordinate system is translated into the cursor moving differently inside the region.

12. A non-transitory computer readable medium having stored thereon instructions to configure a computing device to:
- display a graphical user interface (GUI) on a display, the GUI comprising a cursor at a position in a first coordinate system and a user-selectable interface element, wherein the first coordinate system is an unaltered coordinate system of the GUI;
- detect a first change in orientation of the computing device based at least in part on data from a device movement sensor;
- converting the first change in orientation of the computing device into a second change in coordinates of the cursor in a second coordinate system, wherein the second coordinate system is a transformed cursor-control coordinate system to adjust the position of the cursor based on the second change, the second change to be mapped to the first coordinate system;
- move the cursor in the first coordinate system based on the second change;
- associate a region of GUI with the user-selectable interface element, the cursor moving differently inside the region in comparison to outside the region relative to a same change in the orientation of the computing device,
wherein:
  - in response to the cursor being outside the region, the instructions configure the computing device to translate the first change in orientation into movement of the cursor that is proportional to the first change, and
  - in response to the cursor being inside the region, the instructions configure the computing device to apply a mathematical transform to translate the first change in orientation into movement of the cursor that is not proportional to the first change; and
- alter movement of the cursor inside the region of the GUI associated with the user-selectable interface element to pull the cursor toward a center of the user-selectable interface element wherein a small change in device orientation will not cause the cursor to move when the cursor is at the center.

13. The non-transitory computer readable medium according to claim 12, further configuring the computing device to:
- select the user-selectable interface element in response to the cursor remaining over the user-selectable interface element for a specified duration of time.

14. The non-transitory computer readable medium according to claim 12, further configuring the computing device to:
- select the user-selectable interface element in response to a signal indicating an interaction with a button while the cursor is over the user-selectable interface element.

15. The non-transitory computer readable medium according to claim 12, further configuring the computing device to:
- identify an object as a head or face using a camera;
- detect a change in a position of the identified object; and
- compare the detected change in the position of the identified object with data from the device movement sensor,
wherein the detected change in orientation of the computing device is further based on the detected change in the position of the identified object in response to the data from the device movement sensor being inconsistent with the detected change in the position of the identified object.

16. The non-transitory computer readable medium according to claim 12, wherein an area of the region associated with the user-selectable interface element is larger or smaller than an area of the user-selectable interface element.

17. The non-transitory computer readable medium according to claim 12, further configuring the computing device to:
- receive a first indication to activate orientation-based cursor control;
- move the cursor based on the first change in the orientation of the computing device in response to receiving the first indication;
- receive a second indication to deactivate orientation-based cursor control; and
- discontinue moving the cursor based on the first change in the orientation of the computing device in response to receiving the second indication.

18. The non-transitory computer readable medium according to claim 12, further configuring the computing device to:
- convert the detected change into the second change in coordinates of the second coordinate system to be mapped to the first coordinate system, wherein the second change in coordinates of the second coordinate system is translated into the cursor moving differently inside the region.

* * * * *